April 15, 1941.  M. P. LAURENT  2,238,742

CLAMP FITTING

Filed Dec. 9, 1938

Inventor
Milton P. Laurent.

By J. Vincent Martin
and Ralph R. Browning.
Attorneys

Patented Apr. 15, 1941

2,238,742

UNITED STATES PATENT OFFICE 2,238,742

CLAMP FITTING

Milton P. Laurent, Houston, Tex.

Application December 9, 1938, Serial No. 244,731

3 Claims. (Cl. 24—243)

This invention relates to a means for exerting a clamping or other force upon a pipe fitting or the like, and is particularly suited for use in adapting the usual tie-rod clamps used for securing together high pressure equipment in oil and gas fields to various types and sizes of fittings.

It is the general object of this invention to provide a means for adapting a clamping device to various forms and sizes of fittings with which it may be used.

In assembling the manifolds and flow lines customarily employed in removing fluids from high pressure wells, such as oil or gas wells, it is the usual practice to make these manifolds, usually called Christmas trees, from a plurality of individual parts secured together by means of threads, bolted flanges and the like and to then reinforce the assembly thus provided by securing to opposite extremities of the assembly cross arms known as tie-rod clamps and extending tie-rods between these tie-rod clamps. This arrangement makes it possible for the assembly to withstand a much higher pressure from within than would otherwise be permissible. However, in the past the practice has been to provide a different size of tie-rod clamp for each size of fitting with which it was intended to cooperate. In fact, certain fittings have been especially made with projections for receiving these tie-rod clamps and special tie-rod clamps providing for engaging such projections or other seating parts.

It is an object of this invention to provide a means whereby any one of a number of sizes of usual tie-rod clamps may be employed with any one of a number of sizes of fittings.

Another object of this invention is to provide a means whereby a tie-rod clamp of the usual type adapted to fit around a part of or projection on a fitting may be employed to exert a force against a fitting having no such available part.

Another object of this invention is to provide a means whereby a tie-rod clamp may be used in connection with a fitting having only a limited space available for the reception of the force exerted by the tie-rod clamp.

Other objects and advantages of this invention will become apparent from the following description taken in connection with the accompanying drawing, it being understood that the same are by way of illustration and example only and that they are not to be taken by way of limitation.

Figure 3:
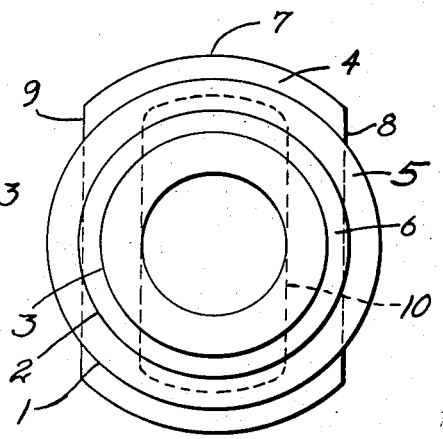
Fig. 3 is a top plan view of the device.

The adapter as illustrated in the drawing consists of a single unitary part having a hollow interior. The upper portion of this part is of circular cross section and its outer surface is stepped to provide a plurality of parts 1, 2 and 3 of different outer diameters, each having a shoulder 4, 5 and 6 at one end thereof. The other portion of the device is of flattened circular cross section. That is, a portion of this cross section is circular as indicated at 7, whereas on its opposite sides it is flattened as at 8 and 9. The interior hollow portion within this lower part of the device is of a similar cross section, as shown at 10 by the dotted lines in Fig. 3.

Adjacent its lower end, the curved walls are turned inwardly as at 11 and 12, whereas the flattened side walls are cut away along their arcuate lines 13 which side walls are cut away along their arcuate line 13 which is of a shorter radius than the radius of any pipe or fitting with which this device is intended to be used. The end faces of the inturned walls 11 and 12 may be made slightly arcuate as at 14 if desired.

Figure 1:
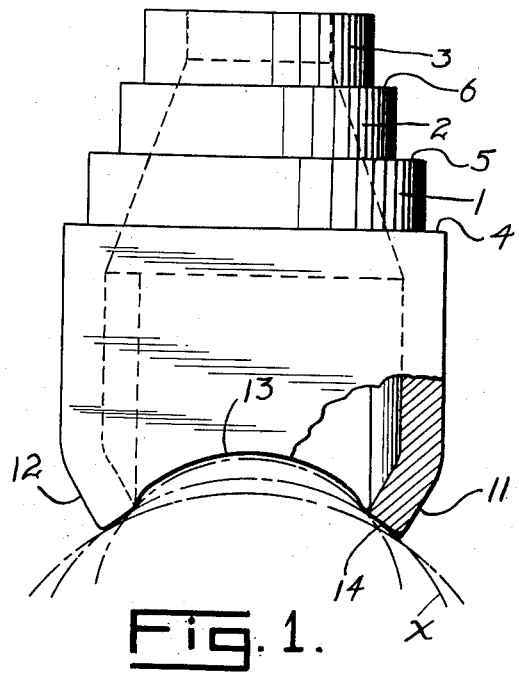
Fig. 1 is an enlarged view partly in vertical cross section and partly in elevation illustrating an adapter constructed in accordance with this invention.
Figure 2:
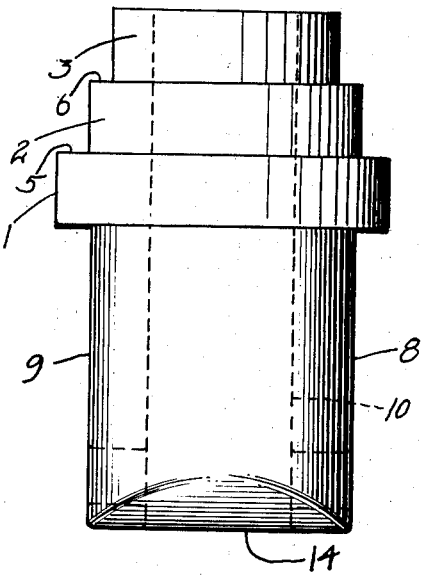
Fig. 2 is an elevation of the same device taken at right angles to the view shown in Fig. 1.

In use, the fitting just described may be employed to bear against any one of a large number of sizes of arcuate surfaces such as the exterior of fittings used in making up Christmas trees. The various broken lines at the bottom of Fig. 1 show the outlines of various sizes of arcuate surfaces with which this device may be employed. The end faces 14 are shown as conforming in curvature with the broken line $x$. Inasmuch as the edges 14 extend in a straight line from one flat side of the fitting to the other as shown in Fig. 2, this will positively prevent rocking of the device on an arcuate surface of any type so long as that surface is substantially cylindrical. As for rocking in the other direction, that is in a plane at right angles to the axis of the arcuate surface, this is prevented by virtue of the fact that there is a two line contact with the arcuate surface and that at no intermediate point does this device come in contact with such surface. The device will thus seat firmly and with a non-rocking seat upon any one of a great variety of sizes of arcuate surfaces.

The other end of the device is provided with cylindrical portions 1, 2 and 3 of various sizes adapted to receive the most common sizes of tie-rod clamps. While three of these cylindrical parts are illustrated it will be appreciated that any number desired may be provided.

Figure 4:
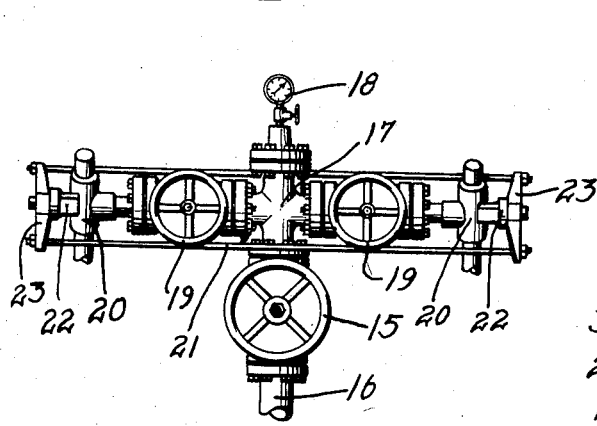
Fig. 4 is an elevation on a reduced scale showing the application of the device to the Christmas tree of an oil or gas well.

In employing this device upon a Christmas tree such as illustrated in Fig. 4 of the drawing, it will be seen that the Christmas tree is made up of a master valve 15 which is secured to the pipe 16 leading from the well and on which is mounted a cross fitting 17. On the upper arm of this cross fitting is mounted a pressure guage 18 or other desired connection and on the opposite lateral arms of this cross fitting there are connected valves 19 and T-fittings 20. These T-fittings 20 will lead to the various flow lines for conducting the flow of fluid from the well.

Now, the problem is to reinforce the two laterally extending sets of fittings consisting of the valves 19 and the T-fittings 20 and to prevent these arms from being blown off by pressure from within the Christmas tree. The usual practice is to provide a special tie-rod clamp having a part shaped to the identical arcuate curvature of the T-fitting against which it is to bear and to extend between these tie-rod clamps the tie-rods 21. These tie-rods then serve to reinforce the lateral arms of the Christmas tree.

The present invention provides an adapter or device which makes it possible to use any one of a number of ordinary tie-rod clamps having an opening therethrough. The margin of this opening will bear against one of the several shoulders of the adapter. It thus makes a substantially universal adapter for a tie-rod clamp. One of the fittings above described is placed against the arcuate surface of each of the T-fittings 20 as indicated generally at 22 and a tie-rod clamp 23 of whatever size may be available is placed over the opposite end of the device of this invention about one of the portions 1, 2 or 3, depending upon its size and against the corresponding shoulder 4, 5 or 6. The tie-rods are placed in position and tightened up as before.

By the present invention there has been provided a means whereby any one of a number of different more or less standard sizes of tie-rod clamps may be employed in connection with any size of fitting. In fact, one size and type of tie-rod clamp may be employed on one arm of the Christmas tree shown in Fig. 4 and another size and type employed on the opposite arm by the use of the present invention.

In addition to the foregoing, there are certain fittings which have projections or flanges closely adjacent the part against which the force exerted by the tie-rods must be placed. In such instances, the present invention again comes into play because of the fact that it has flattened opposite side surfaces 8 and 9 making it much narrower in a direction longitudinally of the arcuate surface with which it will come in contact. It is thus enabled to fit between projections that may be present on those surfaces or in the event that there is a projection exactly in the middle of the area against which the tie-rod string is to be placed, this fitting may be made to straddle such projection, the projection in that instance extending into the hollow interior of the device provided by this invention.

From the foregoing it will readily be apparent that a means has been provided for carrying out all of the objects and advantages sought by this invention.

Having described my invention, I claim:

1. A tie-rod clamp adapter comprising a member having spaced substantially straight contact portions at one extremity adapted to bear against an arcuate surface along spaced lines of contact, and a part at the other extremity of circular cross section and stepped outer surface to provide shoulders and a plurality of parts of different outer diameters adapted to project into an opening of any one of a number of varying sizes and to bear against the edges of said opening.

2. A tie-rod clamp adapter comprising a member having concentric, stepped parts at one end providing shoulders of varying sizes adapted to receive a tie-rod clamp having an opening of any one of a number of different sizes, and having parts at the opposite end comprising spaced substantially straight contact portions adapted to contact an arcuate surface.

3. A tie-rod clamp adapter comprising a member formed at one end with a plurality of concentric portions of circular cross section arranged in stepped relation, the diameters of successive portions decreasing toward the extremity of the member and said portions having relatively square shoulders therebetween to receive a tie-rod clamp of any one of a number of different sizes, said member adjacent its opposite end being substantially flattened at its sides, and having spaced substantially straight contact portions extending between said flattened sides at the opposite edges thereof, said flattened sides being cut away between said contact portions to permit said contact portions to contact arcuate surfaces of various diameters.

MILTON P. LAURENT.